United States Patent [19]

Ballard et al.

[11] Patent Number: 4,981,827

[45] Date of Patent: Jan. 1, 1991

[54] CATALYSTS

[75] Inventors: Denis G. H. Ballard; Peter J. I. Runciman, both of Chester; Anthony Pickering, Cheshire, all of England

[73] Assignee: Imperial Chemical Industries PLC, London, England

[21] Appl. No.: 290,322

[22] Filed: Dec. 27, 1988

[30] Foreign Application Priority Data

Dec. 24, 1987 [GB] United Kingdom ................ 8730131

[51] Int. Cl.$^5$ ............................................... C08F 4/16
[52] U.S. Cl. ................................... 502/153; 502/152; 502/155; 502/158; 502/162; 502/164; 502/167; 556/9; 556/12; 556/13; 556/14; 556/20; 556/29; 556/30; 556/81; 556/404; 556/410; 526/193
[58] Field of Search ............... 502/152, 153, 155, 158, 502/162, 164, 167; 556/9, 12, 13, 14, 20, 29, 30, 81, 404, 410

[56] References Cited

U.S. PATENT DOCUMENTS

| | | | |
|---|---|---|---|
| 3,565,823 | 2/1971 | Parshall ................................ | 502/164 |
| 3,655,705 | 4/1972 | Lengnier ............................ | 502/162 X |
| 4,450,299 | 5/1984 | Oswald et al. .................... | 502/158 X |
| 4,613,673 | 9/1986 | McEntire et al. ................ | 502/155 X |
| 4,873,212 | 10/1989 | Stapersma ............................ | 502/158 |

Primary Examiner—Patrick P. Garvin
Attorney, Agent, or Firm—Cushman, Darby & Cushman

[57] ABSTRACT

A catalyst for addition polymerisation comprising
(a) an (initiator) first component of formula (I):

$$M(X_m)(Y_n)Z_p \qquad (I)$$

wherein
M is Si, Ge or Sn m and p are each an integer and n is 0 or an integer such that $(m+n+p)=4$;

X is $QR^1R^2$ where Q is N, P, As or $P(=T)G.D$ where T is O or S and G and D are each independently a bond, O or S and $R^1$ and $R^2$ are each independently optionally substituted hydrocarbyl or together are optionally substituted hydrocarbadiyl which are inert in the process conditions of the present invention, or, when Q is $P(=T)G.D$ as hereinbefore defined, $R^1$ and $R^2$ are each independently $M(Y_n)Z_p$ as hereinbefore defined.

Y is independently any group as defined for X, or any group selected from a group OA where A is optionally substituted hydrocarbyl inert in the process conditions of the present invention, or trialkylsilylalkyl;

Z is independently any group as defined for Y, or an organic polymer radical comprising further $M(Y_n)Z_p$ moieties; or p is 2 and $Z_2$ is a group $Z^1_8$ of the formula - $OSiR^5R^6OSiR^7R^8O$- where $R^5$, $R^6$, $R^7$ and $R^8$ are each independently selected from any of the values defined for $R^1$ or $R^2$, or $Z^1_2$ is a moiety —EDE— where E is a bond or O and B is a polymer diradical, or E is O and D is an inorganic solid on whose surface the two —O— groups are located, which comprises further —$OMX_mY_nO$ moieties;

(b) and a (co-catalyst) second component salt comprising an anion selected from, azide, cyanide, cyanate, fluoride, bifluoride, nitrate and organic mono- and poly-phosphonates, -phosphinates -sulphonates, -sulphinates, -carboxylates, -siloxides and -oxides (including aliphatic and aromatic anions of these types); and a cation which in use of the catalyst is inert under the polymerisation process conditions yet renders the co-catalyst available in the polymerising medium, initiator components for such catalysts, compositions comprising such components, and a polymerisation process, in particular the addition polymerisation of vinylic monomers, using the catalysts.

7 Claims, No Drawings

CATALYSTS

This invention relates to polymerisation catalysts, in particular to catalysts for addition polymerisation, in particular of vinylic monomers, to initiator components for such catalysts, to compositions comprising such components, and to a polymerisation process, in particular the addition polymerisation of vinylic monomers, using the catalysts. (The term 'polymerisation' herein includes all types of polymerisation, including homo- and co-polymerisation, and the term 'monomer' herein included a reference to oligomers).

It is desirable to be able to produce high molecular weight polymers in catalysed addition polymerisation, in particular of vinylic (including acrylic) monomers.

It is also desirable to be able to achieve the bulk polymerisation of such monomers. However, hitherto this has been difficult to achieve, especially in the case of acrylics, owing to the tendency of known catalysed systems to suffer from an excessive and uncontrollable reaction exotherm, and most polymerisations of this type have therefore disadvantageously had to be carried out in solution.

We have found that the catalysts of this for invention may be used advantageously to produce high molecular weight polymers, and especially in some cases for controlled bulk polymerisation of vinylics, in particular of acrylics.

Accordingly, the present invention in a first aspect provides a catalyst for addition polymerisation comprising (a) an (initiator) first component of formula (I):

$$M(X_m)(Y_n)Z_p \quad (I)$$

wherein

M is Si, Ge or Sn m and p are each an integer and n is 0 or an integer such that $(m+n+p)=4$;

X is $QR^1R^2$ where Q is N, P, As or P(=T)G.D where T is O or S and G and D are each independently a bond, O or S and $R^1$ and $R^2$ are each independently optionally substituted hydrocarbyl or together are optionally substituted hydrocarbadiyl which are inert in the process conditions of the present invention, or, when Q is P(=T)G.D as hereinbefore defined, $R^1$ and $R^2$ are each independently $M(Y_n)Z_p$ as hereinbefore defined.

Y is independently any group as defined for X, or any group selected from a group OA where A is optionally substituted hydrocarbyl inert in the process conditions of the present invention, or trialkylsilylalkyl;

Z is independently any group as defined for Y, or an organic polymer radical comprising further $M(Y_n) Z_p$ moieties; or p is 2 and $Z_2$ is a group $Z^2_2$ of the formula $OSiR^5R^6OSiR^7R^8O$- where $R^5$, $R^6$, $R^7$ and $R^8$ are each independently selected from any of the values defined for $R^1$ or $R^2$, or $Z^1_2$ is a moiety —EDE— where E is a bond or O and D is a polymer diradical, or E is O and D is an inorganic solid on whose surface the two —O— groups are located, which comprises further —$OMX_mY_nO$- moieties; and (b) a (co-catalyst) second component salt comprising an anion selected from azide, cyanide, cyanate, fluoride, bifluoride, nitrate and organic mono- and poly-phosphonates, -phosphinates -sulphonates, -sulphinates, -carboxylates, -siloxides and -oxides (including aliphatic and aromatic anions of these types, optionally substituted by electron withdrawers, such as cyano, halo including chloro, and nitro in aromatic moieties); and a cation which in use of the catalyst is inert under the polymerisation process conditions yet renders the co-catalyst available in the polymerising medium.

The cation may render the catalyst available inter alia by rendering it soluble to an extent which renders the use of the catalyst practicable.

In the (initiator) first component a) of the catalyst:
Favoured M is Si.

The term 'optionally substituted' herein in relation to X, Y and Z groups includes substitution by pendent mono-or di-valent groups, and, in relation to X only, includes substitution by hetero-atoms.

It will be appreciated that, although bonds between M and at least one of X, Y or Z break in the catalytic process of the present invention, the groups themselves should be inert in the process conditions. For this reason such groups, even when described as optionally substituted, are often unsubstituted by pendent monovalent substituents.

Within X (i.e. $QR^1R^2$ as hereinbefore defined), Q is often N, P, P=O or O—P(=O)—O, in particular N and P.

Suitable $R^1$ and $R^2$ optionally substituted hydrocarbyl include optionally substituted alkyl, cycloalkyl (including polycycloalkyl), alkenyl, cycloalkenyl, aryl and aralkenyl.

Suitable $R^1$ and $R^2$ optionally substituted alkyl and such alkyl as a component within $R^1$ or $R^2$ include optionally substituted $C_{1-4}$ alkyl, in particular methyl. Such alkyl groups are often unsubstituted.

When X is N or P, such $R^1$ and $R^2$ groups include optionally substituted oxo-substituted alkyl, i.e. optionally substituted carboxylic acyl, for example such $C_{1-4}$ alkanoyl, in particular acetyl, optionally substituted by halo, such as trifluoroacetyl.

Suitable $R^1$ and $R^2$ optionally substituted cycloalkyl include such $C_{5-8}$ cycloalkyl, for example cyclohexyl, and polycycloalkyl. Such cycloalkyl groups are often unsubstituted.

Suitable $R^1$ and $R^2$ optionally subsituted alkenyl and such alkenyl as a component within $R^1$ and $R^2$ include optionally substituted $C_{2-4}$ alkenyl, in particular methylprop-1-enyl (methallyl).

Suitable $R^1$ and $R^2$ optionally substituted cycloalkenyl include such $C_{5-8}$ cycloakenyl, for example cyclohex-1-enyl, especially when Q is N. Such cycloalkenyl groups are often unsubstituted.

Suitable $R^1$ and $R^2$ optionally substituted aryl include phenyl optionally substituted by substituents inert in the desired polymerisation conditions, which include alkyl, perfluoroalkyl and aryl. Such aryl groups are however often unsubstituted.

Suitable $R^1$ and $R^2$ optionally subsituted aralkenyl include the above suitable alkenyl groups substituted by the above suitable aryl groups, and thus include 2-methyl-l-phenylprop-l-enyl (phenylmethallyl) optionally substituted in the phenyl ring, but more often unsubstituted 2-methyl-l-phenylprop- 1-enyl.

Suitable $R^1$ and $R^2$ optionally substituted aralkyl groups include the above suitable alkyl groups substituted by the above suitable aryl groups, and thus include benzyl and benzoyl optionally substituted in the phenyl ring, but more often unsubstituted benzyl or benzoyl.

When Q is N, $R^1$ and $R^2$ are favourably together optionally substituted hydrocarbadiyl.

In one preferred group, such $(R^1+R^2)$ are unsubstituted by hetero-atoms.

In a second preferred group, such $(R^1+R^2)$ are substituted by hetero-atoms other than nitrogen In a third preferred group, such $(R^1+R^2)$ are unsubstituted by pendent monovalent substituents.

In a fourth preferred group, such $(R^1+R^1)$ have $\alpha$ and/or $\omega$ saturated carbon atoms substituted by oxo groups.

For all values of Q:

Suitable $(R^1+R^2)$ optionally substituted hydrocarbadiyl exclude 1,2-diyl, but include optionally substituted alkaldiyl, cycloalkadiyl (including polycycloalkadiyl), alkenediyl, alkapolyenediyl, cycloalkenediyl, arylene and diradical combinations of such diradicals such as arylenealkyl, arylenealkenyl and arylenecycloalkyl.

Suitable $(R^1+R^2)$ optionally substituted alkadiyl include $\alpha,\omega$-$C_{3-6}$ alkadiyl optionally substituted by at least one hetero-atom or -group such as O, S or $NR^3$ where $R^3$ is independently any of the values of $R^1$, or independently another group $M(Y_n)Z_p$ as hereinbefore defined. Corresponding $QR^1R^2$ groups thus include 4 to 7-member heterocyclyl groups, such as pyrrolidino, piperidino and morpholino, and $N'$—$C_{1-4}$ alkylpiperazino, and phospha-analogues thereof, in particular morpholino. Such groups are often not further substituted.

When X is N, such $(R^1+R^2)$ groups include similarly optionally substituted, $\alpha$-oxo- or $\alpha,\omega$-dioxosubstituted alkadiyl, i.e. $QR^1R^2$ may be a 4 to 7-member lactamido or cycloimido group such as N-piperidonyl or succinimido. Such groups are often not further substituted.

Suitable $(R^1+R^2)$ optionally substituted alkenediyl and alkapolyenediyl include $\alpha,\omega$-$C_{4-6}$ alkenediyl, $\alpha,\omega$-$C_{4-6}$ alkadienediyl and $\alpha,\omega$-hexatrienediyl optionally substituted by at least one hetero-atom or group, such as O or S, or $NR^3$ where $R^3$ is independently any of the values of $R^1$. Corresponding $QR^1R^2$ groups thus include 5- to 7- member unsaturated heterocyclyl groups such as 1-pyrryl, pyrrolinyl, imidazolyl and imidazolinyl, in particular imidazolyl. Such groups are often not further substituted.

When X is N, such $(R^1+R^2)$ groups include similarly optionally substituted $\alpha$-oxo- or $\alpha,\omega$-dioxo-distributed alkenediyl, i.e. $QR^1R^2$ may be a heterocyclyl group such as oxazolid-2-on-3-yl.

$R^1$ and $R^2$ may each be alkylene - or arylene-carbonyl in a polyamide chain bearing other $M(Y_n)Z_p$ groups.

Suitable $(R^1+R^2)$ optionally substituted arylene groups include biphenyl-2,2'-diyl optionally substituted as for $R^1$ and $R^2$ aryl. Corresponding $QR^1R^2$ groups thus include optionally substituted 9-carbazolyl and its phospha analogue. Such groups may be substituted in the aryl moiety by alkyl but are often unsubstituted.

Suitable $(R^1+R^2)$ optionally substituted arylenealkyl groups include groups composed of a 1,2-arylene moiety and an $\alpha,\omega$-$C_{2-4}$ alkadiyl, which latter may be $\alpha$-oxo-substituted. Such $QR^1R^2$ groups thus include benzo-fused 5 to 7 member saturated heterocyclyl groups such as N-indanyl and N-indan-2-onyl and their phospha analogues. Such groups may be substituted in the aryl moiety by alkyl but are often unsubstituted.

Suitable $(R^1+R^2)$ optionally substituted arylenealkenyl groups include groups composed of a 1,2-arylene moiety and an $\alpha,\omega$ $C_{2-4}$ alkenediyl. Such $QR_1R_2$ groups thus include benzo-fused 5 to 7-member unsaturated heterocyclyl groups such as N-indolyl and its phospha analogue. Such groups may be substituted in the aryl moiety by alkyl but are often unsubstituted.

Suitable $(R^1+R^2)$ optionally substituted arylenecycloalkyl groups include groups composed of a 1,2-arylene moiety and 1',2'-$C_{5-7}$ cycloalkadiyl moiety. Corresponding $QR^1R^2$ groups thus include 1,2,3,4-tetrahydro-9-carbazolyl and its phospha analogue. Such groups may be substituted in the aryl moiety by alkyl but are often unsubstituted.

Suitable A groups within Y and Z include optionally substituted alkyl, cycloalkyl (including polycycloalkyl), alkenyl, cycloalkenyl, aryl, aralkyl, alkyl disubstituted by arylene, alkenyl disubstituted by arylene and cycloalkylalkyl disubstituted by arylene.

Within Y, Z and A groups comprising component alkyl groups, favoured alkyl groups include $C_{1-4}$ alkyl, in particular methyl.

Within Y, Z and A aralkyl groups, favoured optionally substituted aryl groups include optionally substituted phenyl and 1-naphthyl. Suitable substituents for such aryl groups include substituents inert in the desired polymerisation conditions provided the conjugate protic acid of such aryl groups has a $pK_a$ in DMSO < 18. Such groups will be readily apparent to the skilled man, but include alkyl and aryl groups.

Such aryl groups are often unsubstituted. Suitable Y, Z and A cycloalkyl groups include polycycloalkyl, in particular adamantyl.

Suitable Y, Z and A alkyl groups include $C_{1-20}$ alkyl groups, such as $C_{1-8}$ alkyl groups. Suitable $C_{1-8}$ alkyl groups include favoured straight-chain $C_{1-4}$ alkyl groups, e.g. methyl and ethyl, and also favourably include branched $C_{4-8}$ alkyl groups, in particular those with a high degree of branching, e.g. optionally substituted (but often unsubstituted) neopentyl.

Suitable Y and Z alkoxy groups thus include $C_{1-4}$ alkoxy, in particular methoxy and ethoxy.

Suitable Y and Z optionally substituted cycloalkoxy groups thus include $C_{4-7}$ cycloalkoxy, thus including cyclohexyloxy, any of which may be $\alpha$-oxo or $\alpha,\omega$-dioxo substituted.

Suitable Y and Z optionally substituted aryloxy groups thus include optionally substituted phenoxy, such as phenoxy and pentafluorophenoxy. Other suitable substituents include those listed above for Y and Z aryl groups.

Favoured Y and Z aralkoxy groups thus include phenyl $C_{1-4}$ alkoxy, in particular benzyloxy, optionally substituted in the phenyl ring. Suitable substituents include those listed above for Y and Z aryl groups.

When A in Y or Z is optionally substituted alkyl disubstituted by arylene, the latter may be optionally substituted biphenyl-2,2'-diyl or 1,2-phenylene, so that corresponding suitable Y and Z optionally substituted alkoxy disubstituted by arylene include methoxy disubstituted by optionally substituted biphenyl-2,2'-diyl, i.e. fluorenyl-9-oxy, and propoxy 1,3-disubstituted by 1,2-phenylene, i.e. indanyloxy. Such groups are often unsubstituted. However if any arylene moiety in A is substituted, suitable substituents include those listed above for substituents of aryl groups within Y, Z and A.

When A in Y or Z is optionally substituted alkenyl disubstituted by arylene the latter may be 1,2-phenylene so that corresponding suitable Y and Z optionally substituted alkenyloxy disubstituted by arylene include allyloxy 1,3-disubstituted by optionally substituted 1',2'- phenylene, i.e. optionally substituted 1-indenyloxy. Such groups are often unsubstituted.

Catalysts of the present invention in which the initiator component (a) has at least one group Y, Z or A which is optionally substituted aralkyl or cycloalkyl (especially polycycloalkyl) or optionally substituted branched alkyl may be used advantageously in vinylic bulk polymerisation systems, especially where any such group is bulkily substituted aralkyl, or adamantyl or neopentyl, and other such suitable Y and Z groups also include fluorenyl-9-oxy and indenyl-1-oxy. The same advantages attach to initiator components where X is a suitable 1-aza analogue of the foregoing Y, Z or A groups.

When p is 2, favoured $Z_2$ groups include $-OSiR^2R^6OSiR^7R^8O-L$ where $R^5$ to $R^8$ are the same and are optionally substituted benzyl (in particular benzyl), $C^{1-6}$ alkyl or optionally substituted phenyl. $R^2$ to $R^5$ are often unsubstituted.

Where Z is an organic polymer radical, or $Z_2$ is or comprises a polymer diradical, the polymer is preferably a particulate one insoluble in any desired polymerisation system (for example a highly-cross-linked polymer with the $MX_mY_n$ moieties on its surface). Preferably the polymer is a solid granulate of relatively high surface area, for example in the range 200 to 600 $m^2/gm$, favourably with a concentration of $MX_mY_nZ$ moieties of 1 per 3 to 30 square Angstrom.

M in each $MX_mY_nZ$ moiety may be linked to the polymer via a carbon atom on e.g. a pendent alkyl containing chain of the type described for Y and Z straight chain alkyl above.

Depending on the polymerisation medium, highly cross-linked alkylene, arylene, acrylic or styrene homo- or co- polymers may be a appropriate for B polymer diradicals.

Favoured $Z_2$ groups also include $-ODO-$ where B is an inorganic solid with a plurality of surface hydroxyl functions, such as silica or a metal hydroxide or hydrated oxide, e.g. alumina. B may be inter alia a flat body of low specific surface area or (preferably) particulate with a relatively high specific surface area, for example in the range 200 to 600 $m^2/gm$. Favourably, the $-OMX_mYnO-$ moieties are present on the surface at a concentration of 1 per 3 to 30 square Angstrom. This may be achieved by involving at least 20%, preferably at least 60%, of the available surface hydroxyl functions in $-ODO-$bonding to $M_mY_n$ moieties.

Favoured X groups thus include acyclic $QR^1R^2$ as defined such as N-methylacetamido, N-methyltrifluoroacetamido, N-cyclohex-1-enyl-N-methylamino, diphenylamino, diphenylphosphino, dibenzylamino and dibenzylphosphino, N-phenyl-2-methyl-l-phenylprop-1-enylamino, and cyclic $QR^1R^2$ as defined such as 1-pyrryl, 1-imidazolyl pyrrolidino, piperidino, morpholino, N'-methylpiperazino, 9-carbazolyl and N-indolyl, oxazolid-2-on-3-yl and aryl-containing groups amongst the foregoing, optionally substituted in the or an aryl moiety by alkyl, perfluoroalkyl or aryl, N'-trimethylsilylpiperazine-2,5-dion-1-yl N-acetylphenylamino, succinimido, indan-2-oryl, N-trifluoroacetylphenylamino, piperidine-2,6-dionyl, 9-phosphafluorenyl, benzoylphenylphosphino, 1-phosphacyclopentyl, diethylphosphino, O,O¹-dibutylphosphonato, phenyl (2-methyl-1-phenylpropenyl)phosphino, benzylbenzoylphosphino, 1-phosphacyclohexyl, acetylethylphosphino, O,O'-dicyclohexylphosphonato.

Favoured Y groups include methyl, optionally substituted phenyl and benzyl, adamantyl, neopentyl, methoxy and ethoxy, phenoxy, pentafluorophenoxy and benzyloxy optionally substituted in the phenyl ring, in particular, benzyl, methyl and ethoxy.

Favoured Z groups include those listed for Y above, and, when p=2, favoured $Z_2$ groups include $-OSiR^1{}_2OSiR^1{}_2O-$ where $R^1$ is optionally substituted benzyl, $C_{1-6}$ alkyl or optionally substituted phenyl, and the favoured $-ODO-$ functions described above.

Favoured anions in the co-catalyst second catalyst component include azide, cyanide, cyanate, fluoride, bifluoride and aliphatic and aromatic mono-sulphonates, and in particular fluoride, bifluoride and methanesulphonate ions.

Favoured cations therein, which render the catalyst available in the polymerisation medium, are often substituted -onium ions. These include quaternary ammonium and phosphonium, and tris(dialkylamino)sulphonium, often substituted by relatively bulky organic-soluble groups e.g. $C_{3-6}$ alkyl, such as butyl, or $C_{5-8}$ cycloalkyl. Alkali and alkali earth metal cations are less preferred but may be used if, in addition to the cations of the second catalyst component, the catalyst also includes solublisation aids, for example crown ethers, to complex the cations in the second component.

Typically the catalyst may comprise the first and second components in molar ratios in the range of 300:1 to 3:1 more often 100:1 to 8:1.

Where, for example, a crown ether is present this will of course be present in an appropriate molar ratio to the second component, for example in the range of 0.3:1 to 3:1.

In a second aspect the present invention provides an initiator component (a) of formula (I) for the catalyst of the first aspect of the invention.

A group of catalyst first (initiator) components consists of those of formula (II)

$$MX(Y_q) Z^2{}_r \qquad (II)$$

wherein
M is Si, Ge or Sn
q and r are each an integer such that (q+r)=3,
X and Y are as defined hereinbefore; and $Z^2$ is a monovalent Z group as hereinbefore defined.

Suitable and favoured X, Y and $Z^2$ are as so described for relevant X, Y and Z hereinbefore.

Suitable and favoured groups X in formula (II) include respectively any of the groups $QR^1R^2$ composed of those variables Q, $R^1$ and $R^2$ or $(R^1+R^2)$ correspondingly described as suitable or favoured hereinbefore, and X preferably is diphenylphosphino, 9-carbazolyl, 1-imidazolyl, N-phenyl-2-methyl-1-phenylprop-1-enylamino, morpholino or oxazolid-2-on-3-yl.

Y is preferably be $C_{1-4}$ alkyl such as methyl, aryl such as phenyl, or it may be $C_{1-4}$ alkoxy such as ethoxy, irrespective of the nature of Z.

Z may be a monovalent non-polymeric or polymer radical group. In a preferred sub-group within formula (II) Z is often the former, and may then be $C_{1-4}$ alkyl such as methyl, aryl such as phenyl, or it may be $C_{1-4}$ alkoxy such as ethoxy.

Particular first components within a preferred sub-group within formula (II) are those in which q=0, r=3 and, within Z, Q is N or P and $R^1$ and $R^2$ or $(R^1+R^2)$ have values such that X is diphenylphosphino, 9-carbazolyl, 1-imidazolyl, N-phenyl-2-methyl-1-phenyl-prop-1-enylamino morpholino or oxazolid-2-on-3-yl.

When Q is N, $R^1$ and $R^2$ are favourably together optionally substituted hydrocarbadiyl, and favoured X include 9-carbazolyl, 1-imidazoyl, morpholino and oxazolid-2-on-3-yl.

In one preferred group, such $(R^1+R^2)$ are unsubstituted by hetero-atoms, and preferred X include 9-carbazoyl.

In a second preferred group, such $(R^1+R^2)$ are substituted by hetero-atoms other than nitrogen, and preferred X include morpholino.

In a third preferred group, such $(R^1+R^2)$ are unsubstituted by pendent monovalent substituents, and preferred X include 9-carbazoyl, 1-imidazoyl, morpholino and oxazolid-2-on-3-yl.

In a fourth preferred group, such $(R^1+R^2)$ have $\alpha$ and/or $\omega$ saturated carbon atoms substituted by oxo groups, and preferred X include oxazolid-2-on-3-yl.

Catalysts comprising a component (a) of this preferred sub-group are of interest for use in vinylic bulk polmerisation systems, in particular acrylic systems of this type.

When, in a second sub-group within formula (II), the or each Z substituent is a polymer radical, this will typically be a polymer as described for B in formula (IV) below.

A second group of catalyst first (initiator) components consists of those of formula (III):

$$MX(Y)Z^3{}_2 \qquad (III)$$

wherein

M, X, and Y are as defined in formula (II);

and $Z^3{}_2$ is a group of the formula  —$OSiR^5R^6OSiR^7R^8O$— as defined in formula (I).

Suitable, favoured and preferred variables are as so described for corresponding variables hereinbefore.

A third group of first catalyst components consists of those of formula (IV):

$$MX(Y)Z^4{}_2 \qquad (IV)$$

wherein

M, X and Y are as defined in formula (II); and $Z^4{}_2$ is a moiety  —EDE— where E is a bond or O and D is a polymer diradical, or E is O and D is an inorganic solid on whose surface the two —O-groups are located, which comprises further —OMX(Y)O-moieties.

Suitable and preferred X and Y are as so described in formula (II).

B is preferably a solid granulate of a polymer insoluble in any desired polymerisation system (e.g. highly cross-linked), or of silica or alumina, with further M(X)Y moieties on the surface at a concentration of 1 per 3 to 30 $A^2$, and with a specific surface area of 200 to 600 $m^2/gm$.

Depending on the polymerisation medium, highly cross-linked alkylene, arylene, acrylic or styrene homo- or Co- polymers may be appropriate for B polymer diradicals.

In the case of silica or alumina the favoured concentration of M(X)Y moieties may be achieved by involving at least 20%, preferably at least 65%, of the available surface hydroxyl functions in —OBO— bonding.

The initiator component (a) of the catalysts of the present invention may be used as such, or may be formulated into compositions with other materials, for example such conventional materials as catalyst supports. Such compositions for use in the catalysis of addition polymerisation, in particular of vinylic monomers, form a third aspect of the present invention.

Compositions comprising a component (a) of formula (II) form a favoured group of such compositions, and preferred and particular compositions include those which comprise a component (a) described as preferred or particular hereinbefore.

Where such a composition is insoluble it may be seen as an alternative to insoluble forms of the initiator component itself, i.e. when Z is a polymer radical or diradical or $Z_2$ is a moiety —ODO—, all as hereinbefore defined. The initiator component in such a composition is often one in which the substituents are other than those immediately above adhered to or embedded in the surface of a support (rather than chemically bonded to it as hereinbefore. The support may comprise an insoluble polymer, e.g. a highly cross-linked acrylic or styrene homo- or co-polymer, preferably a particulate one.

In a fourth aspect the present invention provides an addition polymerisation process catalysed by a catalyst of the first aspect of the invention. The process may be the polymerisation of vinylic monomers (including oligomers), in particular bulk polymerisation especially of acrylic monomers or oligomers. The term 'polymerisation' herein includes homo- and co-polymerisation, and named monomer species hereinafter include a reference to homo- and co-oligomers of those monomer species.

The catalysts and compositions of the present invention are used in conventional manner in such a process.

The process may be carried out using a number of different embodiments of the catalysts of the first aspect of the invention. Thus, for example, both the initiator component (a) and the co-catalyst component (b) may be soluble in a monomer to be polymerised and/or in a reaction vehicle. In a second embodiment the initiator (a) may be in an insoluble form, such as one of those initiators which comprises an insoluble organic polymer or inorganic moiety-, e.g. where in formula (I), p is 2 and $Z_2$ is a group —EDE— as hereinbefore defined; or the initiator may be comprised in an insoluble composition such as a conventional insoluble catalyst support. All such insoluble forms are described hereinbefore.

Under the polymerisation process conditions the co-catalyst (b) must be available to effect polymerisation in the polymerisation medium and this often means it must be soluble in at least one liquid monomer species, in a solvent compatible with the monomer(s) and inert in the present process conditions and/or, in phase which contains at least one monomer species, to such an extent that it can catalyse the reaction adequately. Thus in bulk polymerisations, if the co-catalyst is not soluble in a monomer, an inert solvent compatible with the monomer(s) may be used, but just in sufficient quantities to dissolve the co-catalyst.

Examples of suitable inert solvents or vehicles (if desired) include ether solvents such as dimethyl ether, diethyl ether, dimethoxyethane, diethoxyethane, diethyleneglycol dimethyl ether or tetrahydrofuran; and hydrocarbon solvents such as benzene, toluene or xylene. The ether series of solvents are preferred amongst such solvents.

In general such liquids should not contain labile hydrogen or halogen atoms or activated alkenyl groups.

The initiator which forms component (a) is generally used in an amount corresponding to a molar ratio of 1:10 and generally less, and preferably 1:1000 to 1:50 relative to the monomer(s) except where the initiator comprises an insoluble polymeric or inorganic solid (i.e. in formula (I) $Z_2$ is —EDE— where E is a bond or O and D is polymer diradical or E is O and D is an inorganic solid as hereinbefore defined), when the initiator is generally used in an amount corresponding to a molar ratio of 1:100 to 1:5 relative to the monomer(s). As noted hereinbefore, the ratio of initiator (a) to co-catalyst (b) is generally in the molar ratio range of 300:1 to 3:1, more often 100:1 to 8:1, i.e. the co-catalyst is generally used at a molar ratio to monomer of 1:300,000 to 1:400. The ratio of initiator to co-catalyst is given hereinbefore.

Polymerization reactions of this invention may be conducted, for example, at temperatures ranging from $-100°$ C. to $150°$ C.; a range of $-20°$ to $60°$ C. is preferable, or $-100°$ to $30°$ C. in the case of bulk polymerization. These processes may be conducted under 0.1 to 50 atmospheres pressure but normally atmospheric pressure is suitable.

It is desirable that processes of this invention should be conducted under anhydrous conditions, and the water content of the, monomers, polymerization initiators and cocatalysts any solvents minimised in order to obtain high molecular weight polymers by this method.

It is desirable to ensure that processes of this invention are conducted in atmospheres that have been dried in order to prevent the penetration of any water. Such atmospheres would include dry air, or atmospheres of dried inert gases such as nitrogen or argon; dried inert gas atmospheres are preferable.

No particular restrictions are placed on the order in which the polymerization initiator, (a) or a composition comprising it, co-catalyst (b) and monomer are added to the reaction system in processes of this invention and polymerization will proceed whatever sequence is used. For example, the catalyst components may be mixed and added to the monomer. However, in terms of being able to control the polymerization reaction easily, especially in the bulk polymerisation of acrylics, it is desirable to add the initiator (a) or composition comprising it and co-catalyst (b) separately to the monomer, or to add one catalyst component to the monomer or vice versa and add the product mixture to the other catalyst component, or vice versa.

Thus, where the initiator and co-catalyst are both soluble in a solvent in which the monomer is also soluble, it is often desirable to add the initiator and co-catalyst (b) separately to the monomer or a solution thereof. Initiator (a) or co-catalyst (b) added to the reaction mixture should normally be added neat, or in the form of a solution in tetrahydrofuran or the same organic solvent as any used in the polymerization reaction. Often the initiator is added first to the monomer. Similarly where the initiator (a) or its composition is insoluble, it is often desired to add the co-catalyst (b) to the monomer and to contact the product mixture with the initiator (a) or its composition.

In both cases further monomer (which may be the same as or different from the initial monomer) may be added in the second mixing step. If block copolymers are to be prepared by a solution process of this invention using two or more monomers, after initially polymerizing the first monomer using an initiator and co-catalyst, the second monomer is generally added to the initial product polymer solution in solution in a suitable organic solvent, which is normally the same as the first reation solvent.

Any vinylic monomer in which the olefinic moiety is not substituted by any functional group possessing acidic hydrogen atoms may be polymerised in the present process.

Typical examples of vinylic monomers without such functional groups include:

methacrylic acid esters such as methyl methacrylate, ethyl methacrylate, propyl methacrylate, butyl methacrylate, 2-ethylhexyl methacrylate, lauryl methacrylate, glycidyl methacrylate, triethyleneglycol dimethacrylate and tricyclo[5,2,1,0$^{2,6}$]dec-3-en-8-yl methacrylate;

acrylic acid esters such as methyl acrylate, ethyl acrylate, iopropyl acrylate, n-butyl acrylate, sec-butyl acrylate, tert-butyl acrylate and cyclohexyl acrylate;

unsaturated nitriles such as methacrylonitrile and acrylonitrile;

N,N-dialkyl unsaturated amides such as N,N-dimethylacrylamide; and aromatic vinyl compounds such as styrene, o-, m- or p-methylstyrene, o-, m- or p-methoxystyrene α-methylstyrene, o-, m- or p-dimethylaminostyrene or m- or p-chlorostyrene.

Preferable amongst these monomers are methyl methacrylate, lauryl methacrylate, butyl methacrylate, 2-ethylhexyl methacrylate and tricyclo[5,2,1,0$^{2,6}$]dec-3-en-8-yl methacrylate, acrylonitrile, styrene, methyl acrylate, butyl acrylate, methacrylonitrile, α-methylstyrene and p-chlorostyrene, in particular methyl methacrylate, lauryl methacrylate, 2-ethylhexyl methacrylate, tricyclo[5,2,1,0$^{2,6}$]dec-3-en-8-yl methacrylate, butyl acrylate and acrylonitrile. These monomers may be used singly or in combination.

The co-catalyst components (b) are known materials. The initiator components (a) are preparable analogously to, or are routinely derivable, from known materials. For example many of the groups X, Y and Z may be introduced to form the compounds of formula (I) by conventional nucleophilic displacement, and where the M nucleus is linked by two —O— groups to a solid or polymer diradical as hereinbefore defined, the links may be formed by conventional silylation of adjacent hydroxyl groups.

The synthesis of initiators and use of catalysts of the present invention is illustrated by the following Examples:

EXAMPLES 1 AND 2

Preparation of Initiator Components (a) of General Formula MXZ$_3$.

EXAMPLE 1

Preparation of 9-trimethylsilylylcarbazole (E.1)

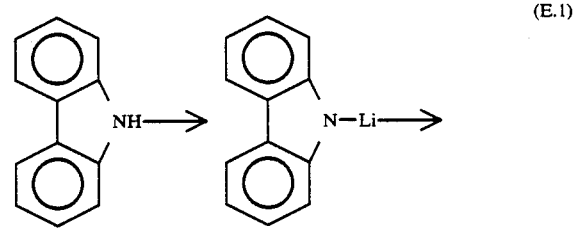

EXAMPLE 2

Preparation of Diphenyl(trimethylsilyl)phosphine (E.24)

This was prepared analogously to (E.1) above from diphenylphosphine.

The following compounds were prepared analogously from the corresponding phosphine and chlorosilane:
9-trimethylsilyl-9-phosphafluorene (E.31)
benzoylphenyltrimethylsilylphosphine (E.32)
1-phospha-1-trimethylsilylcyclopentane (E.33)
diethyltrimethylsilylphosphine (E.34)
dibutyl trimethylsilylphosphonate (E.35)
The following compounds are prepared analogously:
dibenzyltrimethylsilylphosphine (E.36)
P-trimethylsilyl-P-phenyl-2-methyl-1-phenylpropenylphosphine (E.37)
benzylbenzoyltrimethylsilylphosphine (E.38)
1-phospha-1-trimethylsilylcyclohexane (E.39)
acetylethyltrimethylsilylphosphine (E.40)
dicyclohexyl trimethylsilylphosphonate (E.41)

EXAMPLE 3

Preparation of Initiator Components of General Formula MXY(EBE)

A suspension of fumed silica (Carbosil-SM) is lithiated analogously to Example 1, and the product is treated with an excess of 9-carbazolyldichloromethylsilane to give the desired product.

Finely divided alumina may also be used.

EXAMPLE 4

Preparation of Initiator Components of (a) General Formula MXY Z where Z is a Polymer Radical (b) General Formula MXZ. where X is a Polymer Chain (a) Preparation of poly(9-carbazolyldimethylsilylpropyl methacrylate Analogously to Example 1, carbazole is N-lithiated, and the product treated with chloro(3-methacryloxypropyl)dimethylsilane to give the above monomer. The monomer is polymerised conventionally to give the desired product.

(b) Preparation of Poly (N-trimethylsilyl-1-propylbutylene carboxamide

An amorphous nylon, poly-(1-propylbutylenecarboxamide), is N-lithiated in THF solution at $-70°$ C. and the product is treated with chlorotrimethylcilane to give the desired product.

EXAMPLE 5

Polymerisation using Catalysts comprising above Initiator Components

In situ generation of catalyst by combining initiator and co-catalyst.

As noted hereinbefore a co-catalyst salt (second component) (b) of the type of the present invention is not generally added to the initiator (first) component (a) to

---

To a solution of carbazole (15 g) in dry THF (200 ml) was added butyllithium (56 ml; 1.6M in hexane). Once the butyllithium addition was completed, the solution was heated to reflux for 1.5 hours and then allowed to cool. Chlorotrimethylisilane (12 ml) was added dropwise to the cooled mixture and then heated to reflux for 4 hours. Toluene (150 ml) was added to the cool mixture which was then filtered to remove LiCl. The filtrate was collected and the solvent removed under vacuum leaving a crude gray compound. The crude product was further purified by vacuum distillation (0.03 mm Hg 184°–186° C.) to give a white compound (E.1) in an 84% yield.

It could be further purified by recrystallisation in hexane.

n.m.r. (CDCl$_3$); 0.7 s 9H SiMe3; 7.08–8.4 broad 8H aromatic-H.

The following compounds were prepared analogously from the corresponding amine and chlorosilane:
9-triphenylsilylcarbazole (E.2)
N-trimethylsilyl-N-phenyl-2-methyl-1-phenylprop-1-enylamine. (E.3)
N-trimethylsilylmorpholine (E.4)
1-trimethylsilylimidazole (E.5)
3-trimethylsilyloxazolid-2-one (E.6)
The following compounds are prepared analogously from the corresponding amine and chlorosilane:
N-trimethylsilyl-N-methylacetamide (E.7)
N-trimethylsilyl-N-methyltrifluoroacetamide (E.8)
N-trimethylsilyl-N-cyclohex-1-enylmethylamine (E.9)
diphenyl(trimethylsilyl)amine (E.10)
dibenzyl(trimethylsilyl)amine (E.11)
N-trimethylsilylpyrrole (E.12)
1-N-trimethylsilylpyrrolidine (E.13)
N-trimethylsilylpiperidine (E.14)
N-triphenylsilylmorpholine (E.15)
N-methyl-N'-trimethylsilypiperazine (E.16)
N-trimethylsilylindole (E.17)
9-tribenzylsilylcarbazole (E.18)
9-adamantyldimethylsilylcarbazole (E.19)
9-dimethylneopentylsilylcarbazole (E.20)
9-triethoxysilylcarbazole (E.21)
9-triphenoxysilylcarbazole (E.22)
9-tribenzyloxysilylcarbazole (E.23)
N-trimethylsilylindan-2-one (E.24)
N-trimethylsilyltrifluoroacetanilide (E.25)
N-trimethylsilylpiperidine-2 6-dione (E.26)
The following compounds were also prepared anlagously:
N,N'bis(trimethylsiliyl)piperazine-2,5-dione (E.27)
N-trimethylsilylacetanilide (E.28)
N-trimethylsilylsuccinimide (E.29)

form the catalyst before use, but the combination is generated in situ in the polymerisation medium, using components (a) and (b) in an appropriate mutual molar ratio as hereinbefore described.

The exact order of addition of all the components to the polymerisation medium will depend to some extent on the specific conditions, e.g. bulk or solution polymerisation, and on the vinylic monomers to be polymerised. The following conditions are typical for the bulk polymerisation of methacrylic and/or acrylic ester and acrylic nitrile monomers.

The following tetrahydrofuran solutions of co-catalysts were prepared:

(C.1) Tetrabutylammonium fluoride trihydrate, pre-dried under high vacuum and over $P_2O_5$, made up into 0.1M solution.

(C.2) Anhydrous tetrabutylammonium fluoride (Aldrich), made up into 1M solution, dried over $CaH_2$ overnight.

(C.3) Tetrabutylammonium methanesulphonate, made up into 0.1M solution.

(C.4) Tetrabutylammonium fluoride absorbed onto dispersed silica (1.1 mmole of F-/g silica), made up into 0.2M solution.

To a solution of 9-trimethylsilylcarbazole (E.1), initiator component (a) (0.02 g, 0.084 m moles) in methyl methacrylate (5 ml, 46.8 m moles) under nitrogen was added (C.1) Tetrabutylammonium fluoride trihydrate, pre-dried under high vacuum and over $P_2O_5$, made up into 0.1M solution co-catalyst component (b) ($5 \times 10^{-4}$ m moles of $F^-$). After an induction period of 1.5 minutes, the exothermic polymerisation reaction took place. 100% conversion $M_n$ theory 55,700, $M_n$ obs 65,231, $M_w$ 88544 D 1.36.

To a solution of diphenyl(trimethylsilyl)phosphine (E.24), component (a), (0.127 g, 5 m moles) in methyl methacrylate (5 g, 0.05 moles) under nitrogen was added (C.1) Tetrabutylammonium fluoride trihydrate, pre-dried under high vacuum and over $P_2O_5$, made up into 0.1M solution, induction period the exothermic polymerisation reaction took place. Polymer isolation showed a 100% conversion $M_n$ theory 10,000; $M_n$ obs 8643, $M_w$ 15107 D 1.748.

The following reaction components were used analogously, with the following results.

Fluoride is a preferred anion in component, However, azide, cyanide, cyanate, fluoride, bifluoride, and other aliphatic and aromatic mono-sulphonates are used analogously with similar results. Any cation which in use of the catalyst is inert may be used in place of the tetrabutyl ammonium TBA cation, provided that it renders the co-catalyst as soluble in the reaction mixture as the TBA salt.

Initiators (E.27) to (E.29) and (E.30) to (E.35) were also used analogously with similar results.

We claim:

1. A catalyst for addition polymerisation comprising (a) an (initiator) first component of formula (I):

wherein

M is Si, Ge or Sn m and p are each an integer and n is 0 or an integer such that $(m+n+p)=4$;

X is $OR^1R^2$ where Q is N, P, As or $P(=T)A.D$ where T is O or S and A and D are each independently a bond, O or S and $R^1$ and $R^2$ are each independently alkyl, cycloalkyl, alkenyl, cycloalkenyl, aryl, aralkyl, or aralkenyl or $R^1R^2$ together are alkadiyl, cycloalkadiyl, alkendiyl, cycloalkenediyl, arylene or diradical combinations of such diradicals, all of which are optionally substituted by pendent mono- or di-valent substituents or optionally substituted by heteroatoms and which are inert in the process conditions of the addition polymerisation;

Y is independently any group as defined for X, or a group OA where A is a group as defined for $R^1$ or trialkylsilyalkyl, Z is independently any group as defined for Y, or an organic polymer radical comprising further $m(Y_n)Z_p$ as defined; or p is 2 and $Z_1$ is a group —EDE— where E is a bond or O and D is a polymer diradical, or E is O and D is an inorganic solid on whose surface the two —O— groups are located, which comprises further —$OMX_mY_nO$—moieties;

(b) and a (co-catalyst) second component salt comprising an anion selected from azide, cyanide, cyanate, fluoride, bifluoride, nitrate and organic mono- and poly-phosphonates, -phosphinates, -sulphonates, -sulphinates, -carboxylates, -siloxides and -oxides (including aliphatic and aromatic anions of these types), and a cation which in use of the catalyst is inert under the polymerisation process conditions yet renders the co-catalyst available in the polymerising medium.

2. A catalyst according to claim 1, characterised in that the initiator component (a) is of formula II $$MX(Y_g) Z^2_r \qquad (II)$$

and $Z^2$ is a monovalent Z group as defined in claim 1 and g and r are each an integer such that $g+r=3$.

3. A catalyst according to claim 2, characterised in that X is diphenylphosphino, 9-carbazolyl, 1-imidazoyl, N-phenyl-2-methyl -1-phenylprop-1-enylamino, morpholino or oxazolid-2-on-3yl, and $Z^2$ is methyl or phenyl.

4. A catalyst according to claim 1, characterised in that the anion of the co-catalyst component (b) is fluoride or bifluoride.

5. A compound of the formula (I):

$$M(X_m)(Y_n)Z_p \qquad (I)$$

wherein

M is Si, Ge or Sn m and p are each an integer and n is 0 or an integer such that $(m+n+p)=4$;

X is $QR^1R^2$ where Q is N, P, As or $P(=T)A.D$ where T is O or S and A and D are each independently a bond, O or S and $R^1$ and $R^2$ are each independently alkyl, cycloalkyl, alkenyl, cycloalkenyl, aryl, aralkyl, or aralkenyl or $R^1R^2$ together are alkadiyl, cycloalkadiyl, alkendiyl, cycloalkenediyl, arylene or diradical combinations of such diradicals, all of which are optionally substituted by pendent mono- or di-valent substituents or optionally substituted by heteroatoms and which are inert in the process conditions of the addition polymerisation;

Y is independently any group as defined for X, or a group OA where A is a group as defined for $R^1$ or trialkylsilyalkyl, Z is independently any group as defined for Y, or an organic polymer radical comprising further $M(Y_n)Z_p$ as defined; or p is 2 and $Z_2$ is a group —EDE— where E is a bond or O and D is a polymer diradical, or E is O and D is an inorganic solid on whose surface the two —O— groups are located, which comprises further —$OMX_mY_nO$-moieties.

6. A composition comprising an initiator component according to claim 5 and a carrier therefor.

7. A catalyst according to claim 3 wherein X is imidazolyl or oxazolidinyl.

* * * * *